United States Patent [19]

Braden

[11] 4,260,587

[45] Apr. 7, 1981

[54] PRESSURE COMPENSATED POTABLE WATER CHLORINATOR

[76] Inventor: John R. Braden, 315 Dewey Dr., Annapolis, Md. 21401

[21] Appl. No.: 844,778

[22] Filed: Oct. 25, 1977

[51] Int. Cl.³ .............................................. C02F 1/50
[52] U.S. Cl. .................................. 422/282; 210/169; 210/198.1
[58] Field of Search ............ 23/267 E, 272.7, 272.8; 210/62, 169, 198 R; 422/282

[56] References Cited

U.S. PATENT DOCUMENTS

| | | | |
|---|---|---|---|
| 2,142,947 | 1/1939 | Kretzschmar et al. | 23/272.7 X |
| 2,758,877 | 8/1956 | Gleason | 23/272.7 |
| 3,129,172 | 4/1964 | Dickey, Jr. et al. | 23/272.7 X |
| 3,710,817 | 1/1973 | Lorenzen | 23/267 E X |
| 4,026,673 | 5/1977 | Russo | 23/272.8 X |
| 4,067,808 | 1/1978 | Phillips | 23/272.7 X |

*Primary Examiner*—Robert H. Spitzer
*Attorney, Agent, or Firm*—R. S. Sciascia; L. A. Marsh

[57] ABSTRACT

This invention is a water chlorinator for disinfecting potable water flowing through a pipe. A diverting inlet diverts a small portion of the water from the pipe. This water is used to create a concentrated chlorine solution by controlled dissolving of calcium hypochlorite tablets. This chlorine solution is then mixed with the water flowing through the pipe at a point downstream from the diverting inlet. The chlorinator uses a tablet chamber to hold the calcium hypochlorite tablets while they are being dissolved, a solution chamber to hold the concentrated chlorine solution before it is fed back to the pipe, and a pressure compensation chamber to adjust the flow rate of the chlorine solution in response to water pressure changes in the pipe. The chlorinator will function whenever there is water flowing through the pipe.

10 Claims, 3 Drawing Figures

PRESSURE COMPENSATED POTABLE WATER CHLORINATOR

The invention described herein may be manufactured and used by or for the Government of the United States of America for governmental purposes without the payment of any royalties thereon or therefor.

BACKGROUND OF THE INVENTION

This invention relates to water chlorination systems and in particular to bypass chlorinators for treating water flowing through a pipe. This invention was developed to provide a means for chlorinating fresh water aboard ships. One of the most common of the prior art systems used for chlorinating water aboard ships is a controllable displacement pump which injects a concentrated chlorine solution from a storage tank into a fresh water pipe to purify the water flowing through the pipe. The concentrated chlorine solution is prepared by dissolving granular calcium hypochlorite powder in the fifteen to thirty gallon chlorine solution storage tank. The output of the injector pump is adjusted to provide the desired treatment rate. The injector pumps are driven by either an electric motor or a water meter drive. With this type of chlorination system, the injection rate of the chlorine solution into the fresh water is difficult to control. The system will not work if the pump fails or if the electric motors or water meters driving the pump fail. The calcium hypochlorite powder tends to be dangerous to handle and store and mixing the powder with water to form the chlorine solution is very time consuming. Other prior art devices chlorinate water flowing through a pipe by diverting a portion of the water from the pipe, dissolving tablets of a chlorine compound such as sodium hypochlorite in this diverted water, and mixing the resulting concentrated chlorine solution with the undiverted water flowing through the pipe. This type of system does not require special pumps or outside power sources because the force of the water flowing through the pipe will make it work. However, with this bypass type of chlorinator system it is difficult to control the rate in which the concentrated chlorine solution is added to the water flowing through the pipe. The concentration level of chlorine in water treated by these prior art bypass devices tends to change both as a function of the water pressure in the pipe and also as a function of the water flow rate through the pipe. In an ideal bypass water chlorinator, the concentration of the dissolved chlorine compound in the treated water produced by the chlorinator would be independent of both the flow rate and the water pressure within the pipe. It is also desirable to build such chlorinators so that it will be safe, fast and convenient to refill them with sodium hypochlorite tablets.

OBJECTS OF THE INVENTION

It is therefore an object of this invention to provide a water chlorinator that does not require any power source for its operation other than that provided by the force of flowing water through a pipe.

It is another object of this invention to provide a system for chlorinating water flowing under pressure through a pipe which will produce a constant level of concentration of chlorine compound in the water which does not vary as a function of the flow rate or the pressure of the water in the pipe.

A further object of this invention is to provide a system for chlorinating water flowing through a pipe by the controlled dissolving of sodium hypochlorite tablets.

It is yet another object of this invention to provide a water chlorinating system using sodium hypochlorite tablets in which it is easy, safe, and convenient to refill the system with new tablets.

Another object of the invention is to provide a means of adjusting the constant level of chlorine concentration to meet different disinfection requirements.

SUMMARY OF THE INVENTION

The invention is a chlorinating system for treating water under pressure flowing through a pipe. An orifice and a bypass inlet divert a portion of the water flowing through the pipe into the chlorinator. The diverted water is used to dissolve sodium hypochlorite tablets inside the chlorinator to produce a concentrated chlorine solution. The concentrated chlorine solution is mixed with the water in the pipe at another orifice and bypass outlet. The chlorinator comprises a float valve for regulating the flow of water between the inlet and a tablet chamber bypass outlet, a tablet chamber for holding the sodium hypochlorite tablets while they are being dissolved, a solution chamber for holding the concentrated chlorine solution produced in the tablet chamber, a metering valve for adjusting the flow of chlorine solution between the solution chamber and the bypass outlet, and a pressure compensation tank. The bottom of the pressure compensation tak is connected to the pipe through which the water is flowing. The top of the pressure compensation tank contains trapped air which communicates through a vent with trapped air in the top of the tablet chamber and through another vent with the trapped air in the top of the solution chamber. The pressure compensation tank and the associated vents allows the air pressure at the top of the tablet chamber to change in response to changes in water pressure in the water pipe without at the same time causing a change in the water level within the tablet chamber which might affect the concentration of the chlorine solution. A valve in the channel between the bypass inlet in the pipe and the tablet chamber is opened and closed by a float in the solution chamber so that the level of solution in the solution chamber waiting to be mixed with water at the bypass outlet will remain constant. The tablets of calcium hypochlorite are held in a basket which fits inside the tablet chamber and may be easily removed for filling when the tablets are used up. The treated water produced by this chlorinating system will have a constant but adjustable concentration level over a wide range of water pressures and flow rates through the pipe.

BRIEF DESCRIPTION OF THE DRAWINGS

Where the same elements and devices are shown in more than one FIG., they are referenced by the same number in each FIG.

DESCRIPTION OF THE PREFERRED EMBODIMENT

Figures 1, 2:
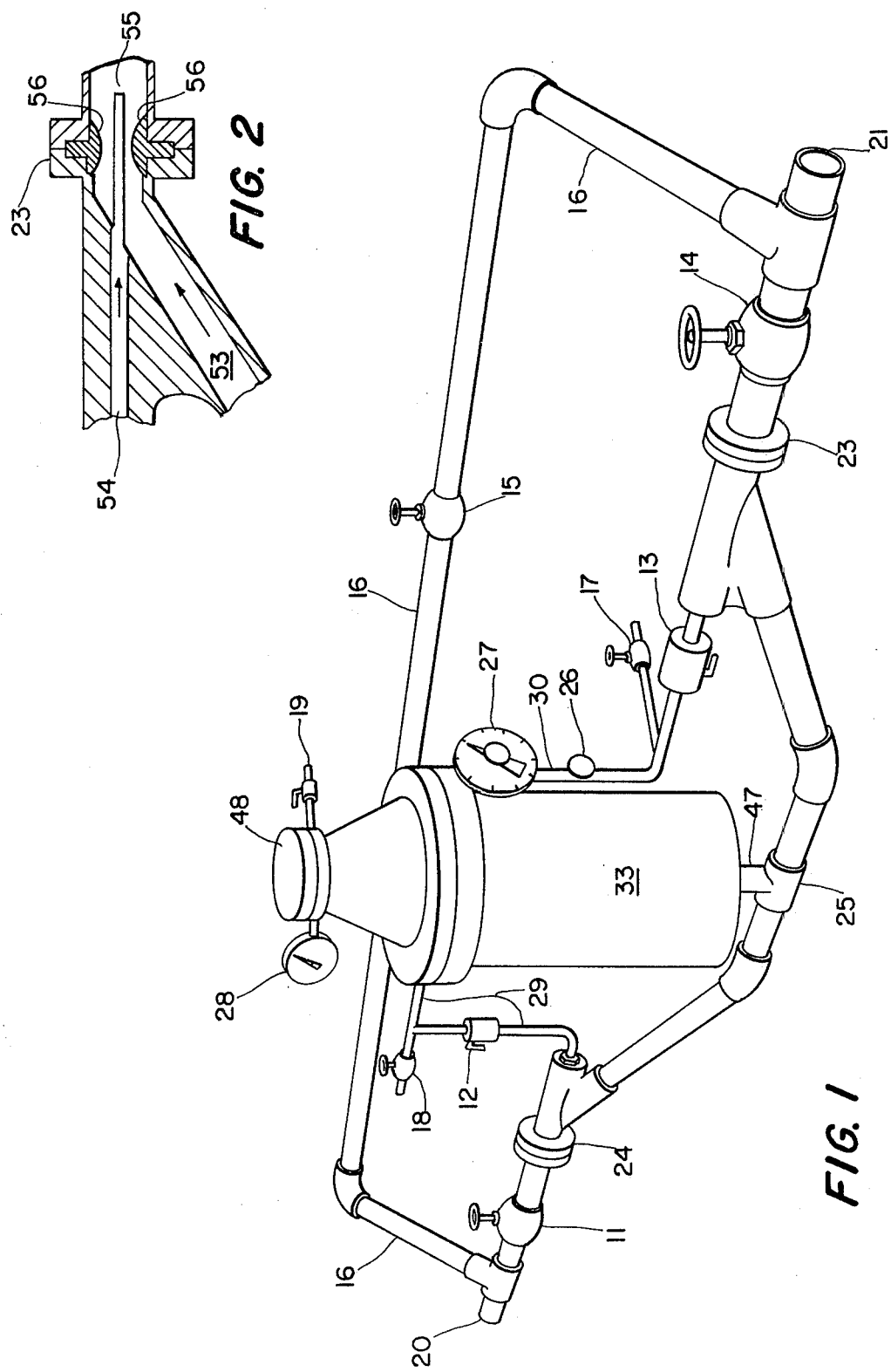
FIG. 1, is a pictorial view of the water chlorinator system.
FIG. 2, is a cross sectional view of an orifice and bypass outlet.

The preferred embodiment of the invention shown in the pictorial view of FIG. 1 is a chlorination system for treating water under pressure flowing through a pipe. Water to be treated enters through the main pipe at the high pressure end 20 of the system and leaves the system through the main pipe at the low pressure end 21. When desired, the chlorination system can be disconnected from the main pipe by turning off the valves 11 and 14 and turning on valve 15 to force the water flow around the shunt pipe 16 from the inlet 20 to the outlet 21. When the chlorination system is in operation, valve 15 will be turned off and valves 11 and 14 will be turned on. The orifice and bypass inlet 24 diverts a small portion of the water entering the system into the bypass inlet channel 29 of the chlorinator 33. The joint 25 in the main water pipe allows water to flow through pipe 47 into the pressure compensation chamber 34 of the chlorinator 33. The concentrated water chlorine solution produced by the chlorinator 33 leaves from the solution chamber 35 through line 30 to the orifice and bypasses outlet 23. The bypass lines 29 and 30 may be closed off by the valves 12 and 13 to allow the chlorinator to be flushed out by water entering through valve 18 and leaving through valve 17. The flow indicator 26 in the line 30 provides a visual indication of whether chlorine solution is flowing through the pipe or not.

FIG. 2, shows a cross sectional view of the bypass outlet and orifice 23. The concentrated chlorine solution leaving the chlorinator 33 through pipe 30 enters the outlet 23 through channel 54. The water flowing in the main water pipe enters the outlet 23 through channel 53. A decrease in water pressure will occur across the orifice plate 56 in the channel 53 whenever water is flowing through the main water pipe. The orifice plate 56 may be changed to adjust the pressure drop. On the low pressure side of the orifice at point 55 the chlorine solution from channel 54 mixes with the water from the main water pipe. The bypass inlet and orifice 24 has the same internal construction as the bypass outlet and orifice shown in FIG. 2. However, the water flows through the bypass inlet and orifice in the opposite direction. After water in the main pipe flows through valve 11 and reaches point 55 in the bypass inlet, a small portion of the water is diverted from the main water pipe and flows out through the water channel 54. The remainder of the water which was not diverted by the bypass inlet travels through the orifice 56 and out channel 53.

Figure 3:
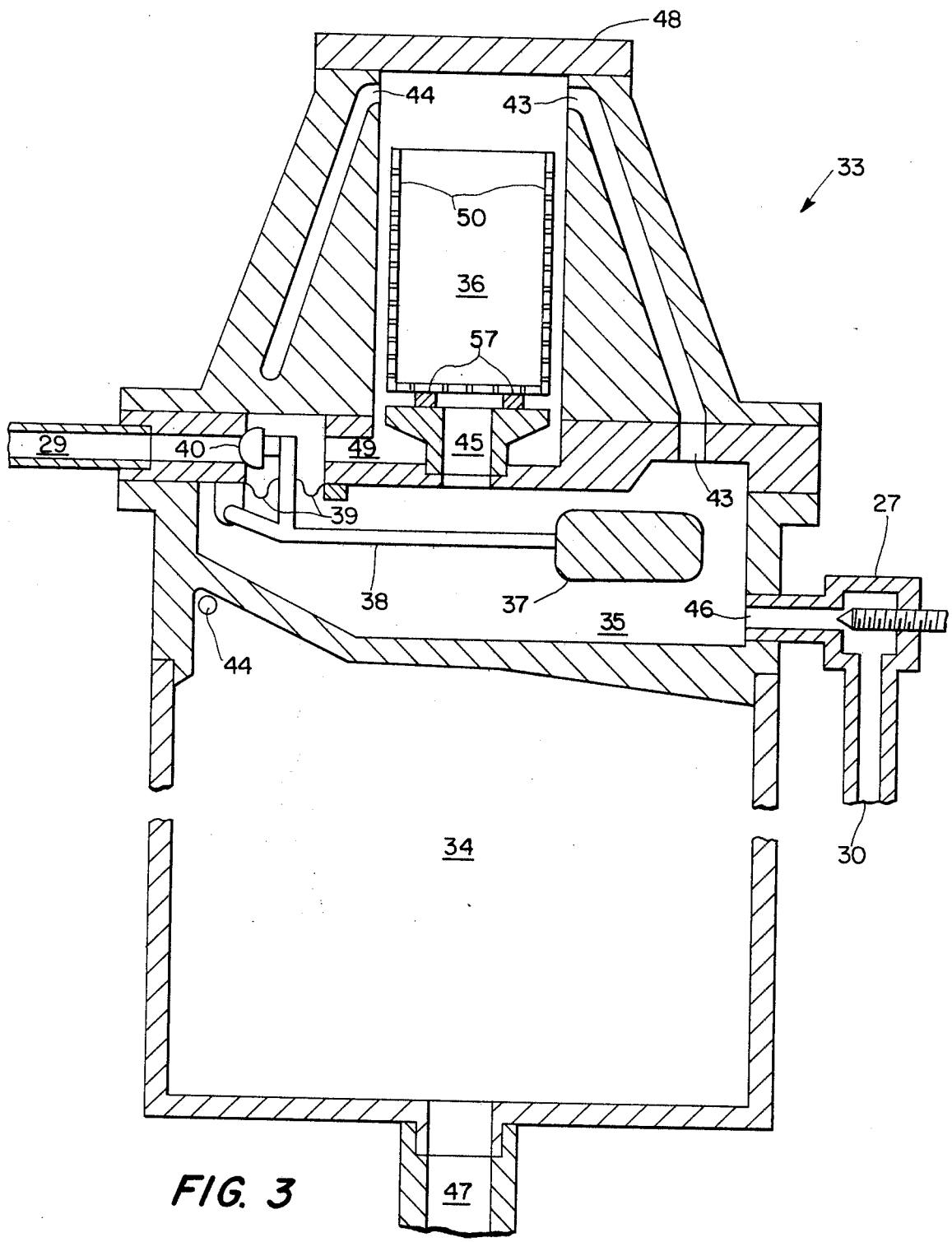
FIG. 3, is a cross sectional view of the chlorinator which is connected to the bypass pipe and the main pipe to form the chlorinating system of FIG. 1.

FIG. 3 shows a cross sectional view of the chlorinator 33. The flow of diverted water entering the chlorinator through pipe 29 is regulated by the valve 40. After water flows through the valve 40 it passes through channel 49 into the tablet chamber 36. A non-metallic basket 50 in the tablet chamber holds a supply of calcium hypochlorite tablets. The basket 50 is made entirely of an open grid-like material that allows the water to flow through freely. Water entering the tablet chamber through channel 49 flows around the base of the chamber, upward around the lower portion of the basket 50, inward through the holes of the basket, through the spaces between the hypochlorite tablets within the basket and out through the central drain 45 into the solution chamber 35. A float 37 in the solution chamber 35 is connected by means of a lever 38 to the valve 40 so that the flow of water through the valve, the tablet chamber and into the solution tank will be regulated so as to produce a fixed level of solution in the solution chamber. The penetration of lever 38 from the solution chamber 35 into channel 49 is sealed, for example, by a flexible diaphragm 39. The concentrated chlorine solution flows out of the solution chamber 35 through line 46, the metering valve 27, and line 30.

The pressure compensation tank 34 is connected to the main water pipe by way of pipe 47 and junction 25. Pipe 47 is large enough so that water may freely move between the pressure compensation tank and the main water pipe whenever there is a change in the water pressure in the pipe. When the chlorinator is in operation, there will be entrapped air at the top of the pressure compensation tank 34, the solution chamber 35, and the tablet chamber 36. The volume of entrapped air in the top of the solution chamber 35 will always be constant because the float 37 controls the valve 40 so as to keep the level of solution in the chamber 35 constant. The float valve will never allow the solution chamber to completely fill up with solution. The passageway 44 connects the pressure compensation tank 34 with the top of the tablet chamber 36 and vent passageway 43 connects the solution chamber 35 with the tablet chamber 36 so that at all times the air pressure inside of the pressure compensation tank, the tablet chamber, and the solution chamber will be equal. When there is water pressure in the main pipe, water will flow into the compensation tank and pressurize the chlorinator by compressing the air pockets trapped in the top of the compensation tank 34 the tablet chamber 36 and the solution tank 35.

When water is flowing through the main pipe, the pressure at the bypass inlet is greater than the pressure of the compensation tank, tablet chamber and solution chamber due to the pressure drop across the bypass inlet orifice. Similarly, the pressure in the compensation tank, tablet chamber, and solution chamber is greater than the pressure at the outlet of the bypass pipe due to the pressure drop across the bypass outlet orifice. It is these differences of pressure that cause the diverted water to flow into the chlorinator and the chlorine solution to flow out of the chlorinator. When the water flow in the main pipe stops, there will no longer be any pressure drops across the orifices and the pressure will equalize throughout the chlorination system thereby causing the flow through the chlorinator to stop also. Whenever the flow to the chlorinator stops, whatever solution that is in the tablet chamber 36 at that time will drain out through the drain 45 into the solution chamber 35. Since water will thus drain out of the tablet chamber whenever the flow of water through the main pipes stops, no additional hypochlorite solution will be produced until the flow in the main pipe starts again. The rate of flow of the chlorine solution from the chlorinator will be directly proportional to the pressure drop in the main pipe across the two orifices between the bypass inlet and the bypass outlet. This pressure drop in the main pipe will be directly proportional to the rate of flow of water through the pipe. Therefore, the rate of flow of the chlorine solution into the bypass outlet will be directly proportional to the rate of flow of water through the main pipe. This proportion may be adjusted by setting the metering valve 27.

Any change in water pressure in the main pipe which does not effect the rate of flow of water through the pipe will not effect the rate of flow of chlorine solution to the bypass outlet because such changes in water pressure will occur simultaneously at the bypass inlet, compensation tank and bypass outlet. For example, if the water pressure in the main pipe were to suddenly increase without effecting the rate of flow through the pipe, the water pressure in the compensation tank 34 would simultaneously increase by the same amount. When the water pressure within the compensation tank 34 increases, the air within the trapped air pocket at the top of the compensation tank will be further compressed. Some of this compressed air will flow through vent 44 into the tablet chamber 36 and some of the compressed air from the tablet chamber will flow through vent 43 to the air pocket at the top of the solution chamber 35. As a result, the air pressure within the trapped air pockets and the water pressure of the water underneath the air pockets will be equalized between the compensation tank 34, the tablet chamber 36, and the solution chamber 35. When the air in the trapped air pockets is compressed, it takes up less volume and water will flow into the compensation tank through pipe 47 until such time as the air and water pressures within the chlorinator are equal to the water pressure within the main pipe at junction 25 between the two orifices. The water level inside the tablet chamber 36 and the solution chamber 35 will not increase because compressed air flows into the two chambers through the vents to compensate for the increased pressure. If the water pressure in the main pipe were to decrease without affecting the flow rate, this sequence of events would be reversed. Air in the trapped air pockets in the top of the solution chamber 35 and tablet chamber 36 would expand and flow through the vents 43 and 44 into the trapped air pocket at the top of the compensation tank 34, the volume of the air pocket in the top of the compensation tank 34 would increase and water would flow out of the bottom of the tank into the main pipe.

The concentration level of the chlorine solution which drains out of the tablet chamber 36 through the drain 45 will be directly proportional to the length of time that a given amount of water is in contact with the hypochlorite tablets. This length of time in turn will be inversely proportional to the rate of flow of water through the tablet chamber and directly proportional to the volume of water in the tablet chamber at any given time. A pressure change within the main pipe which does not effect the rate of flow through the main pipe, will not have any influence over the concentration level of the chlorine solution produced in the tablet chamber since the compensation tank 34 and vent 44 will allow the volume of water within the tablet chamber to remain constant. When the rate of flow of water through the main pipe increases, a larger pressure difference will develop in the main pipe across the bypass outlet orifice. This will result in a greater pressure difference between the solution tank and the bypass outlet and thus result in a faster flow rate of solution from the solution tank through the bypass outlet. When the solution chamber is thus emptied out faster, the float valve will automatically allow water from the bypass inlet to enter into the tablet chamber faster. Because the hypochlorite tablets within the basket 50 tend to restrict the flow of water through the tablet chamber to the drain 45 when the flow rate of water through the tablet chamber increases the level of water within the tablet chamber will increase at the same time. Thus the concentration level of the chlorine solution produced by the tablet chamber will remain approximately the same because the effect of the increased flow rate of water through the tablet chamber will be offset by the increased volume of water in the tablet chamber so that on the average each unit volume of water is spending approximately the same amount of time flowing past and dissolving the hypochlorite tablets. Therefore this chlorinator will produce chlorine solution at a substantially constant concentration level and at a rate which is directly proportional to the flow rate of water through the main pipe without the flow rate or concentration level fluctuating in response to changes in water pressure in the main pipe.

As is shown in FIG. 1, the pressure gage 28 is installed on the top of the tablet chamber to monitor the air pressure within the chamber. An air connection and valve 19 are installed at the top of the tablet chamber to replace air that may be lost through intrainment with the water or seal leakage and thus to control the water levels within the chlorinator. The main body of the chlorinator would normally be constructed using plexiglass or other rigid transparent non-metallic materials to allow visual inspection of the unit while in operation and to prevent corrosion of the parts. For high pressure applications the compensation tank would be proportionally larger and a metallic compensation tank with a sight glass to show the water level would probably be more economical. The top 48 of the chlorinator may be removed so that the non-metallic basket 50 inside the tablet chamber 36 may be removed to replace the hypochlorite tablets. The bottom of the basket 50 is raised slightly above the bottom of the tablet chamber by the stand-off pads 57 so that the water will drain completely out of the basket whenever the chlorinator is not in operation. The size of the pressure compensation tank may be varied to meet the requirements of different system pressures. The tank must be large enough so that it will not completely fill up with water when the maximum system pressure is applied to it. The chlorinator will not operate properly if water from the compensation tank 34 travels through the vent 44 to the tablet chamber 36. To insure that the tablet chamber 36 is not flooded, a floating ball type check valve may be installed in the compensation tank to prevent water from flowing into the vent 44. Alternatively, an impervious expansible bladder type seal could be installed in the compensation tank to separate the water in the tank from the entrapped air and thus to prevent any water from entering into the vent. Various types of orifices could be installed in the main water line and they could be either fixed or variable if desired. The size and shape of the tablet chamber and of the basket which fits within the tablet chamber could be varied depending upon the required tablet capacity or the required concentration level of the solution. Although this invention has been discussed exclusively in terms of its application to producing chlorine solutions in water, the basic principles of this device could be used to mix any dissovable pelletized material with a wide variety of liquids.

One alternative embodiment of this invention would be constructed like the preferred embodiment shown in the drawings except that the solution chamber would be eliminated and the solution would flow directly from the tablet chamber to the mixing orifice. In this embodiment, the float of the float valve would be located in an enlarged passageway through which the diverted water flows between the float valve and the tablet chamber.

Obviously many additional modifications and variations of this invention are possible in light of the above teachings. It should therefore be understood that within the light of the appended claims the invention may be practiced otherwise than as specifically described.

What is claimed is:

1. A system for dissolving a compound in a liquid flowing through a channel comprising:

diverting means in the channel for diverting a portion of the liquid into the system;

solution storage means for storing a concentrated solution of the compound in the liquid;

mixing means for mixing the concentrated solution from the solution storage means into the liquid in the channel downstream from the diverting means;

tablet holding means for holding tablets of the compound so that the liquid entering from said diverting means will dissolve the tablets to produce the solution which flows to said solution storage means;

flow regulating means for regulating the rate of flow of the liquid through the tablet holding means so that the amount of solution stored in the solution storage means will tend to be constant;

pressure compensating means for adjusting the air and liquid pressures inside the system in response to changes in liquid pressure in the channel, said pressure compensating means comprises an air passageway and a pressure compensating tank, said tank being connected to the channel between the diverting means and the mixing means so that liquid may flow between the channel and the tank, with the tank having an air space near its top which is vented through the air passageway with an air space near the top of the tablet holding means.

2. The system of claim 1 wherein:

said solution storage means is a solution chamber, with the solution chamber having an air space near its top;

said tablet holding means comprises a tablet chamber containing a perforated basket for holding the tablets of the compound with a hole in the bottom of the chamber that allows the solution to drain into the solution chamber; and said flow regulating means comprises a float valve with the rate of flow of liquid between the diverter means and the tablet chamber being controlled by the position of a float in the solution chamber which moves up and down with the level of the solution;

said pressure compensating means further comprises a passageway which vents the air space in the solution chamber with the air space near the top of the tablet holding means.

3. The system of claim 2 wherein the liquid used is water and the compound being put into solution is a water soluble chlorine compound.

4. The system of claim 2 further comprising a metering valve connected between the solution chamber and the mixing means so as to regulate the flow of solution to the mixing means.

5. A system for chlorinating water flowing through a main water pipe comprising:

a first orifice in the main pipe for diverting part of the water flowing through the pipe into the chlorinating system;

a solution chamber for storing chlorine solution before it flows into the main water line;

a second orifice in the main water pipe, located downstream from the first orifice, for mixing chlorine solution from the solution chamber into the water flowing through the main pipe;

a float in the solution chamber which rises and falls along with the level of liquid in the chamber;

a tablet chamber containing a perforated basket for holding tablets of a water soluble chlorine compound, the tablet chamber being mounted above the solution chamber and drained into the solution chamber through an outlet in the bottom of the tablet chamber, and a vent passageway connecting the top portion of the solution chamber with the top portion of the tablet chamber;

a valve which admits water diverted by the first orifice into said tablet chamber with the opening and closing of the valve being controlled by rising and falling movements of the float in the solution chamber so that the level of liquid in the solution chamber will tend to remain constant; and a pressure compensation tank with a large inlet near the bottom connected to the main water line between the first orifice and second orifice and with a vent hole near the top through which is connected by a vent passageway to the tablet chamber.

6. The system of claim 5 wherein:

the top of said tablet chamber is removeable to allow said basket to be refilled;

said basket is mounted with respect to said outlet in the tablet chamber so that whenever the flow of water into the tablet chamber is stopped, all of the water surrounding the tablets of chlorine compound will drain away; and a metering valve is placed between the solution chamber and said second orifice to regulate the flow of said solution to the second orifice.

7. The system of claim 5 further comprising a floating ball check valve in said vent passageway for preventing water from flowing from the compensation tank through the vent passageway.

8. The system of claim 5 further comprising an impervious elastic seal across said pressure compensation tank between said inlet near the bottom and said vent hole near the top to prevent water flow from the pressure compensation tank through said vent hole and vent passageway to the tablet chamber.

9. A system for dissolving a compound in a liquid flowing through a channel comprising:

diverting means in the channel for diverting a portion of the liquid into the system;

tablet holding means for holding tablets of the compound so that the liquid entering from said diverting means will dissolve the tablets to produce a solution;

mixing means for mixing the solution from the tablet holding means into the liquid in the channel downstream from the diverting means;

flow regulating means for regulating the rate of flow of the liquid through the tablet holding means;

pressure compensating means for adjusting the air and liquid pressures inside the system in response to changes in liquid pressure in the channel;

said pressure compensating means comprises an air passageway and a pressure compensating tank, said tank being connected to the channel between the diverting means and the mixing means so that liquid may flow between the channel and the tank, with the tank having an air space near its top which is vented through the air passageway with an air space near the top of the tablet holding means.

10. The system of claim 9 wherein the liquid used is water and the compound being put into solution is a water soluble chlorine compound.

* * * * *